(12) United States Patent
Zoolakis et al.

(10) Patent No.: US 11,021,238 B2
(45) Date of Patent: Jun. 1, 2021

(54) DISC SPRING PROVIDING LINEAR AXIAL MOTION

(71) Applicant: Parker-Hannifin Corporation, Cleveland, OH (US)

(72) Inventors: Jason Zoolakis, Syracuse, UT (US); David Hilton, North Ogden, UT (US); Edward Hyrlik, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 481 days.

(21) Appl. No.: 15/890,787

(22) Filed: Feb. 7, 2018

(65) Prior Publication Data

US 2018/0222574 A1      Aug. 9, 2018

Related U.S. Application Data

(60) Provisional application No. 62/455,733, filed on Feb. 7, 2017.

(51) Int. Cl.
| | | |
|---|---|---|
| *G01L 1/04* | (2006.01) | |
| *B64C 13/50* | (2006.01) | |
| *G01D 5/22* | (2006.01) | |
| *F16F 1/02* | (2006.01) | |
| *G01L 7/08* | (2006.01) | |
| *G01L 13/02* | (2006.01) | |
| *F16F 1/10* | (2006.01) | |

(52) U.S. Cl.
CPC ............ *B64C 13/504* (2018.01); *F16F 1/025* (2013.01); *G01D 5/2291* (2013.01); *G01L 1/046* (2013.01); *G01L 7/082* (2013.01); *G01L 13/025* (2013.01); *F16F 1/10* (2013.01)

(58) Field of Classification Search
CPC ... F16F 1/326; F16F 1/10; F16F 1/025; B64C 13/504; G01D 5/2291; G01L 13/025; G01L 1/046; G01L 7/082
USPC .......................................... 244/227; 267/166
See application file for complete search history.

(56) References Cited

U.S. PATENT DOCUMENTS

| 5,234,376 A | 8/1993 | Chimner et al. |
| 8,002,460 B2 | 8/2011 | Daout et al. |
| 8,678,782 B2 * | 3/2014 | Williams .............. F04B 35/045 |
| | | 417/363 |

(Continued)

FOREIGN PATENT DOCUMENTS

| DE | 20 2007 000 158 | 3/2007 |
| JP | 2006003258 | 1/2006 |

*Primary Examiner* — Claude J Brown
(74) *Attorney, Agent, or Firm* — Renner, Otto, Boisselle & Sklar, LLP (57) ABSTRACT

A force sensing element is used in a pressure transducer. The force sensing element includes a flat, disc-type spring having a unitary body that circumscribes a central axis, and a plurality of spirals that are continuous with each other and extend radially outwardly from the central axis. The plurality of spirals includes nested symmetrical flights having walls with a non-uniform thickness, and the disc spring is uniformly deflectable along the central axis in response to force acting on the disc-type spring. The spring is configured to have a high accuracy and a high fatigue life such that the spring is suitable for use in high-pressure applications that may require repeatability while operating with over 10 million cycles of unidirectional or bi-directional axial loading.

16 Claims, 7 Drawing Sheets

(56) References Cited

U.S. PATENT DOCUMENTS

| | | | |
|---|---|---|---|
| 8,764,282 B2* | 7/2014 | Von Gunten | G04B 17/345 |
| | | | 368/175 |
| 8,845,186 B1 | 9/2014 | Von Gunten et al. | |
| 9,183,975 B2* | 11/2015 | Aigner | H01F 7/126 |
| 9,234,554 B2* | 1/2016 | Dadd | F16F 1/027 |
| 10,337,578 B2* | 7/2019 | Collard | F16F 1/326 |
| 2002/0084562 A1* | 7/2002 | Kelsey | F16F 1/326 |
| | | | 267/166 |

* cited by examiner

DISC SPRING PROVIDING LINEAR AXIAL MOTION

This application claims priority of U.S. Provisional Patent Application No. 62/455,733 filed Feb. 7, 2018, which is hereby incorporated herein by reference.

FIELD OF INVENTION

The present invention relates to a force sensing element and more particularly, to a force sensing element that uses a disc-type spring.

BACKGROUND

Various applications may use pressure or force sensing elements to detect the pressure in a system and adjust the operation of the system in response to the pressure detected. For example, a force sensing element may be used in a differential pressure transducer of a servo control system. The servo control system may be used in an aircraft application for controlling an actuator of a flight control surface. The force sensing element is in communication with the actuator, and the transducer is used to determine the pressure load. The transducer communicates with a controller of the servo control system such that the controller can adjust the actuator in response to the determined load. Other high-pressure applications may use similar servo control systems and pressure transducers.

One prior attempt at providing a force sensing element includes using a single helical spring that is deflectable in response to pressure in the system. However, the single helical spring may be deficient in high-pressure applications due to the high forces being exerted against the spring such that the spring may not deflect uniformly. Non-uniform deflection of the spring may cause undesirable side-loading of mating components within the flight control surface actuator. Furthermore, failure in one section of the spring may cause complete failure of the entire spring. Still another deficiency is that the spring may have a short life duration due to continuous high-pressure loading. Other prior attempts at providing a force sensing element have also been deficient due to the force sensing element being too bulky for an aircraft application or too costly to produce.

SUMMARY OF INVENTION

The present invention is directed towards a force sensing spring element that is formed of a unitary spring body having multiple symmetrical spirals with nested helical flights. The flights have walls with a non-uniform thickness and the thickness of the walls increases at a constant rate radially outwardly from the central axis of the spring element. The spring deflects uniformly and symmetrically in both axial directions such that the spring is particularly advantageous as a force sensing element in pressure transducers. The spring is deflectable with minimal or no residual torsional motion. Using the multiple spirals is also advantageous in that a single failure of a section of the spring will not result in a total loss of the spring force. The high precision and accuracy of the spring is achieved by forming the spring to have a non-linearity of less than 1%.

According to an aspect of the invention, a force sensing element is used in a pressure transducer and the force sensing element includes a disc spring having a unitary body that circumscribes a central axis. The disc spring has a plurality of spirals that are continuous with each other and extend radially outwardly from the central axis. The plurality of spirals includes nested symmetrical flights having walls with a non-uniform thickness. The disc spring is uniformly deflectable along the central axis in response to force acting on the disc spring.

According to another aspect of the invention, a servo control system for pressure sensing includes a pressure transducer including a disc spring having a unitary body with a plurality of spirals that are continuous with each other and extend radially outwardly from a central axis of the unitary body. The plurality of spirals including nested symmetrical flights having walls with a non-uniform thickness. The disc spring is uniformly deflectable along the central axis in response to force acting on the disc spring. The servo control system further includes a servo controller in communication with the pressure transducer, and the servo controller is configured to receive an output signal from the pressure transducer when the disc spring is deflected. The servo control system further includes an actuator in communication with the servo controller, and the actuator is actuated in response to the servo controller.

According to an aspect of the invention, a force sensing element is used in a pressure transducer and includes a disc spring having a unitary body that circumscribes a central axis and has a repeating pattern that is symmetrical relative to the central axis, the disc spring being configured to provide linear axial motion while minimizing a radial load, and the disc spring is uniformly deflectable along the central axis in response to force acting on the disc spring.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Figure 1:
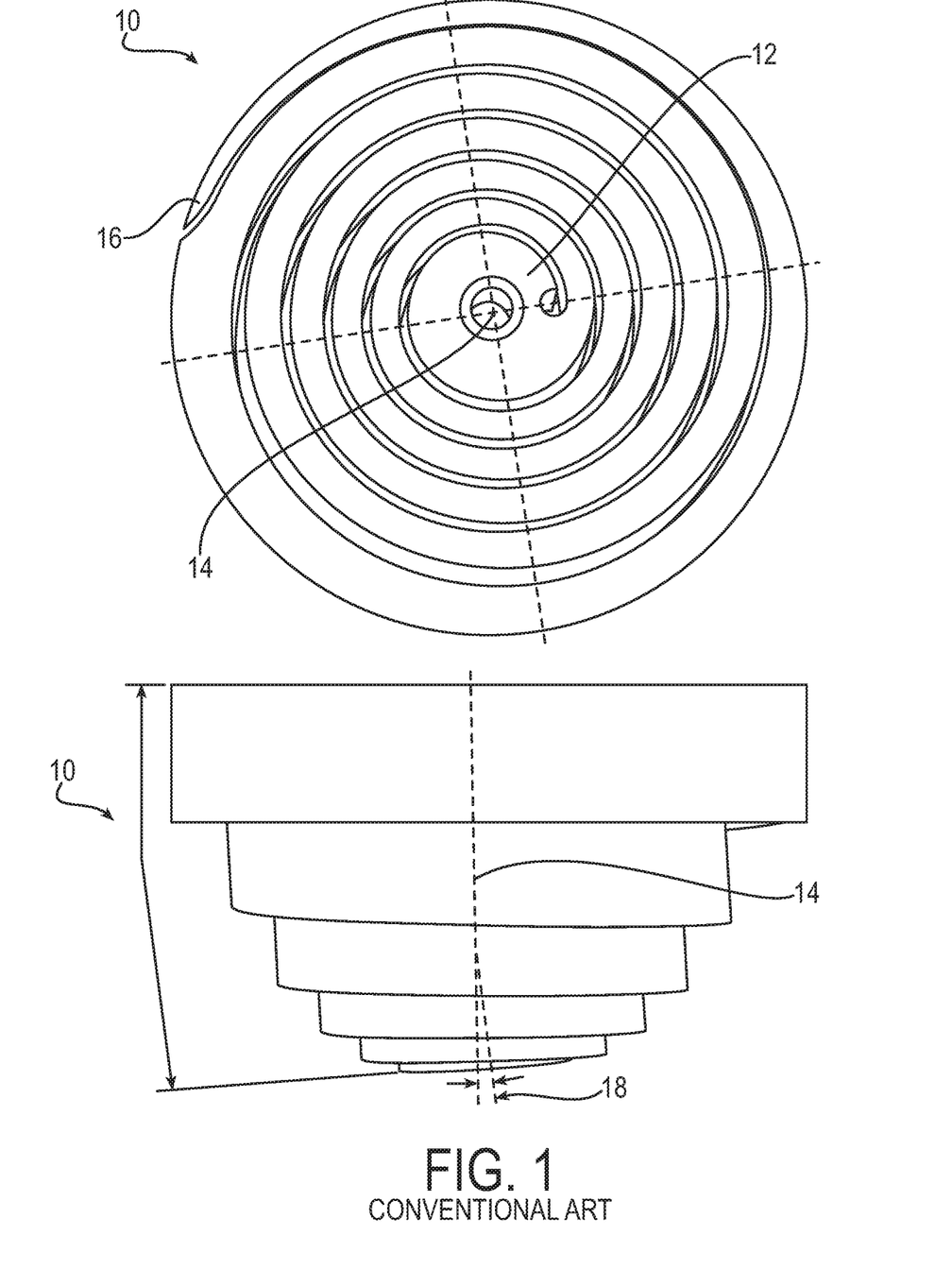
FIG. 1 is a schematic drawing showing a conventional spring having a single spiral.

Aspects of the present invention relate to differential pressure transducer force (or pressure) sensing elements that may be suitable for use in servo control systems. The force sensing element disclosed herein may be used in various applications, such as in aircraft actuators or other high-pressure applications. FIG. 1 shows a conventional force sensing spring element 10. The spring element 10 has a single spiral that spirals from an inner end 12 of the spring element 10 located near a central axis 14 of the spring towards an outer end 16.

As shown in FIG. 1, the spring element 10 deflects non-uniformly along the central axis 14 such that the spring element 10 has residual torsional or radial movement. Due to the residual torsional movement, the center of the spring element 10 shifts a radial distance 18 relative to the central axis 14. The torsional movement of the spring element 10 generally increases as the amount of deflection increases. Accordingly, the conventional spring element 10 having a single spiral may not be suitable in applications that have high pressure and high deflections. In particular, the conventional spring element 10 may not be suitable in an aircraft actuator pressure transducer due to the non-uniform deflection of the spring element 10 causing undesirable side-loading and friction between contacting parts that move axially with the spring deflection.

Figure 2:
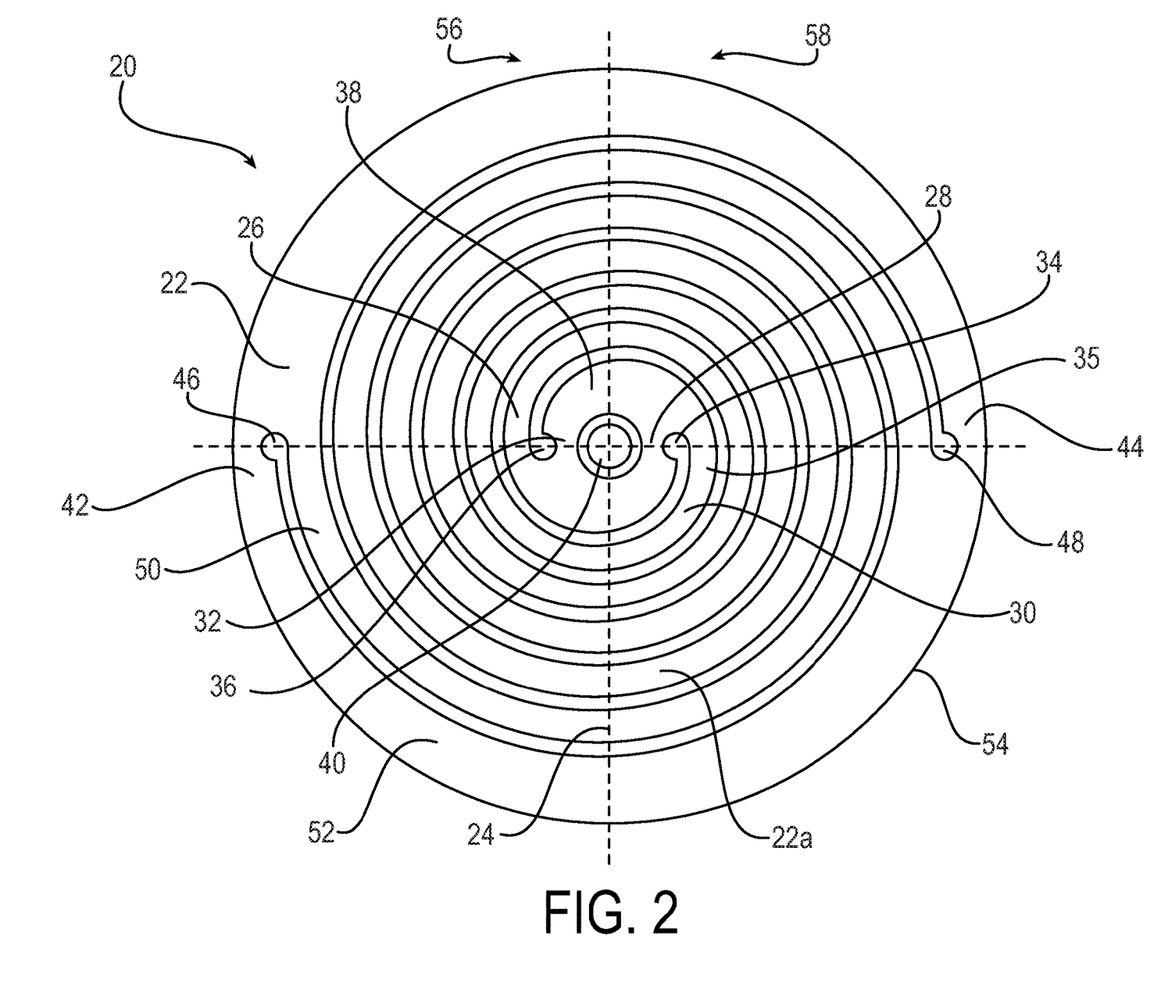
FIG. 2 is a schematic drawing showing a force sensing spring element according to embodiments of the present invention.
Figure 3:
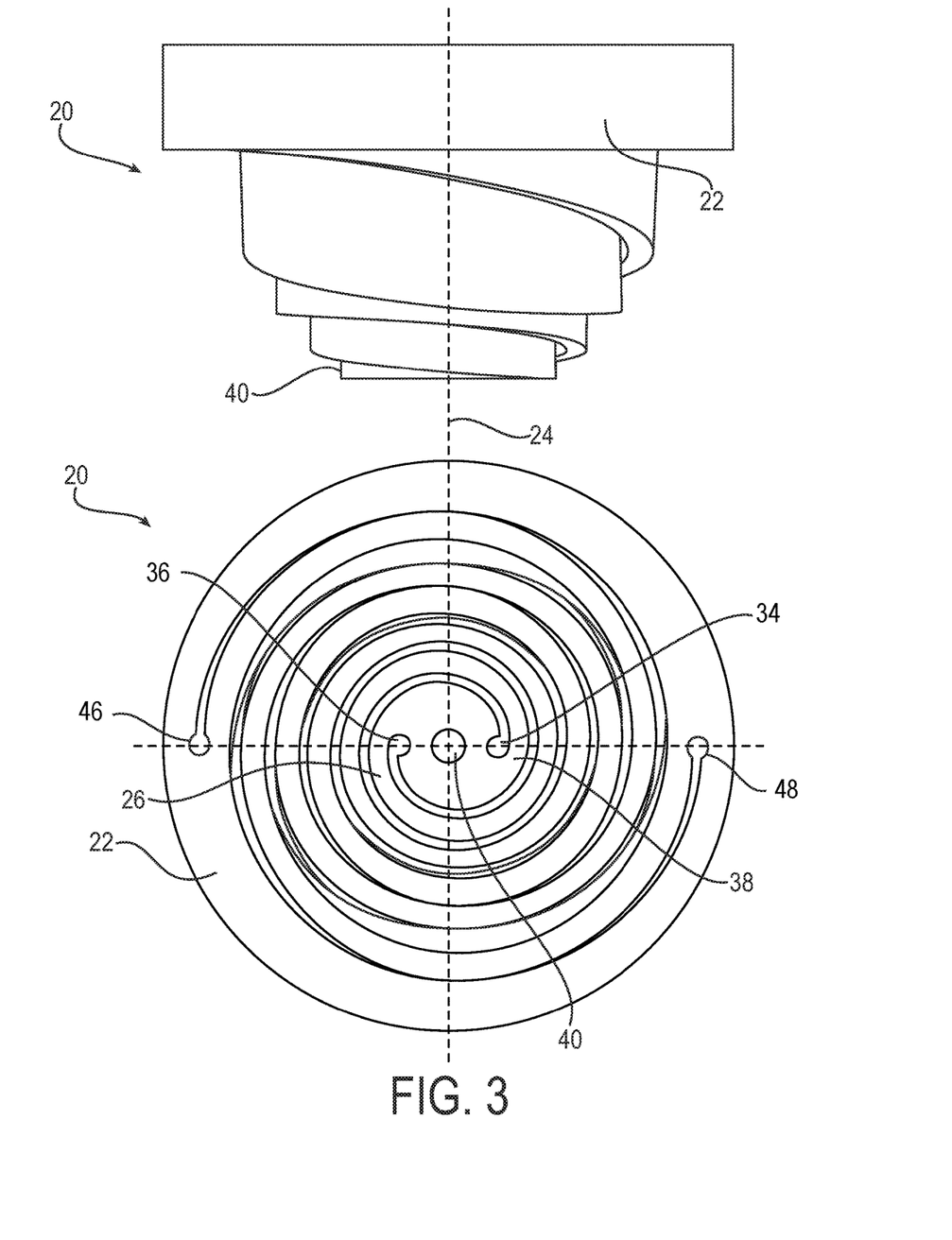
FIG. 3 is a schematic drawing showing the spring element of FIG. 2 in a deflected position.

Referring now to FIGS. 2 and 3, a force sensing spring element 20 according to the present invention is shown. The force sensing spring element 20 is in the form of a flat disc-type spring having a plurality of symmetrical spirals. The force sensing spring element 20 shown in FIGS. 2 and 3 has two spirals, but more than two spirals may be present as suitable for a particular application. The spring element 20 has a unitary body 22 that is generally circular and circumscribes a central axis 24. The unitary body 22 has a first leaf 26 with a first inner end 28 and a second leaf 30 with a second inner end 32. Each of the leaves 26, 30 has a plurality of helical flights that are generally defined by one complete circle. Each of the first inner end 28 and the second inner end 32 may be defined by a respective groove 34, 36 that extends slightly radially inward from a flight of the opposite leaf 26, 30. For example, the first inner end 28 of the first leaf 26 may be defined by a groove 34 that extends radially inward from a flight 35 of the second leaf 30 and the second inner end 32 of the second leaf 30 may be defined by a groove 36 that extends radially inward from a flight of the first leaf 26.

The unitary body 22 is continuous between the first inner end 28 and the second inner end 32 such that the inner ends 28, 32 are arranged along a continuous inner circular portion 38 of the spring element 20. The inner ends 28, 32 of the leaves 26, 30 may be arranged 180° relative to each other. The inner circular portion 38 has an inner diameter 40. The leaves 26, 30 are wound in the same plane and in the same direction. Each of the leaves 26, 30 may be identical. As shown in FIGS. 2 and 3, the leaves 26 and 30 are both wound in a clockwise direction, but both leaves 26, 30 may alternatively be wound in a counterclockwise direction. The leaves 26, 30 are wound into each other or nested such that the flights of each leaf are inserted between the flights of the other leaf.

The first leaf 26 includes a first outer end 42 at the end of the first spiral and the second leaf 32 includes a second outer end 44 at the end of the second spiral. The first outer end 42 and the second outer end 44 may be arranged 180° relative to each other. Each of the first outer end 42 and the second outer end 44 may be defined by a respective groove 46, 48 that extends slightly radially outwardly from a flight of the opposite leaf 26, 30. For example, the first outer end 42 of the first leaf 26 may be defined by a groove 46 that extends radially outwardly from a flight 50 of the second leaf 30. The unitary body 22 is continuous between the outer ends 42, 44 such that the outer ends 42, 44 may be arranged along an outer circular portion 52 of the spring element 20. The outer circular portion 52 may have an outer diameter 54 that defines the outermost diameter of the spring element 20 when the spring element 20 is flat and not deflected.

The inner ends 28, 32 and outer ends 42, 44 may be arranged along a common axis of the spring element 20. A first half 56 of the flat spring element 20 may be defined on a first side of the central axis 24, and a second half 58 of the flat spring element 20 may be defined on the opposite side of the central axis 24. The first outer end 42 and the second inner end 32 may be located within the first half 56 and the first inner end 28, and the second outer end 44 may be located within the second half 58.

As shown in FIG. 3, the spring element 20 may deflect axially along the central axis 24. The spring element 20 may deflect in a first axial direction along the central axis 24 and a second axial direction opposite the first axial direction along the central axis 24. Each of the flights of the unitary body 22 have wall thicknesses 22a that are constantly changing from the inner ends 28, 32 towards the outer ends 42, 44 such that the walls have a non-uniform thickness. The wall thicknesses 22a may gradually increase from the inner ends 28, 32 towards the outer ends 42, 44. The wall thicknesses may decrease from the outer ends 42, 44 towards the inner ends 28, 32 such that the spring element 20 has a tapered spring flight thickness.

In contrast to the spring element 20, conventional deflectable springs have uniform wall thicknesses and may be very thin, such that the conventional springs used in other applications are not suitable for use in high-pressure and force sensing applications in which the force sensing spring must be longer for stress distribution. The conventional springs may also be formed from multiple parts. Accordingly, the spring is less accurate and does not have enough accuracy for use in pressure sensing applications. Providing the unitary spring element 20 that has constantly changing wall thicknesses of the flights is advantageous in that the spring element 20 deflects uniformly and symmetrically along the central axis 24 as shown in FIG. 3. The spring element 20 also has bidirectional deflection movement along the central axis 24. The uniform deflection enables stress to be evenly distributed across the spring element 20 as the spring 20 is deflected such that the spring element 20 is suitable for use in high pressure applications.

Additionally, the uniform deflection of the spring element 20 prevents or provides little torsional deflection of the spring element 20 relative to the central axis 24. Still another advantage of the spring element 20 is that using a double spiral prevents total loss of spring force in the event that the spring element 20 has a single failure point. The spring element 20 may have a predictable change in spring rate if one section between the spiral cuts fails.

The spring element 20 may be formed of any suitable material using any suitable manufacturing process that enables the spring element 20 to have a non-linearity of less than 1%. The spring element 20 may have any suitable diameter and thickness depending on the application. For example, the spring element 20 may have an outer diameter of around 1.2 inches and a total thickness of around 0.3 inches. The spring can be sized for any application, depending on the stroke needed and envelope constraints in the packaging. The spring element 20 may have thicknesses that are greater than conventional flat, spiral springs such that the spring element 20 may withstand greater loads as compared with conventional flat, spiral springs. An exemplary spring element 20 may withstand loads of around 30 pounds, but it should be recognized that the spring dimensions may be modified such that the spring element 20 may withstand loads that are less than 30 pounds or greater than 30 pounds. The spring element 20 may have high precision and accuracy, and the spring element 20 is adjustable to achieve an effective stiffness, or spring rate, as compared with conventional helical or coil springs that may not be capable of being adjustable.

The effective modulus of elasticity (stiffness) of the spring element 20 may be dependent on the application. The effective modulus of elasticity will also be dependent on the specific spring geometry associated with the particular application. The effective modulus results from combined torsional and tensile stiffness properties and may be determined by analysis and/or by testing to determine axial load versus deflection. The spring element 20 may sit flatter as compared with conventional springs. The spring element 20 may have an accuracy, or non-linearity, of around 1% or less as compared with conventional springs that have non-linearities of more than 5%. Conventional springs, such as nested clock springs or wound springs cannot be produced with the tolerances necessary for pressure sensor accuracy.

Figure 4:
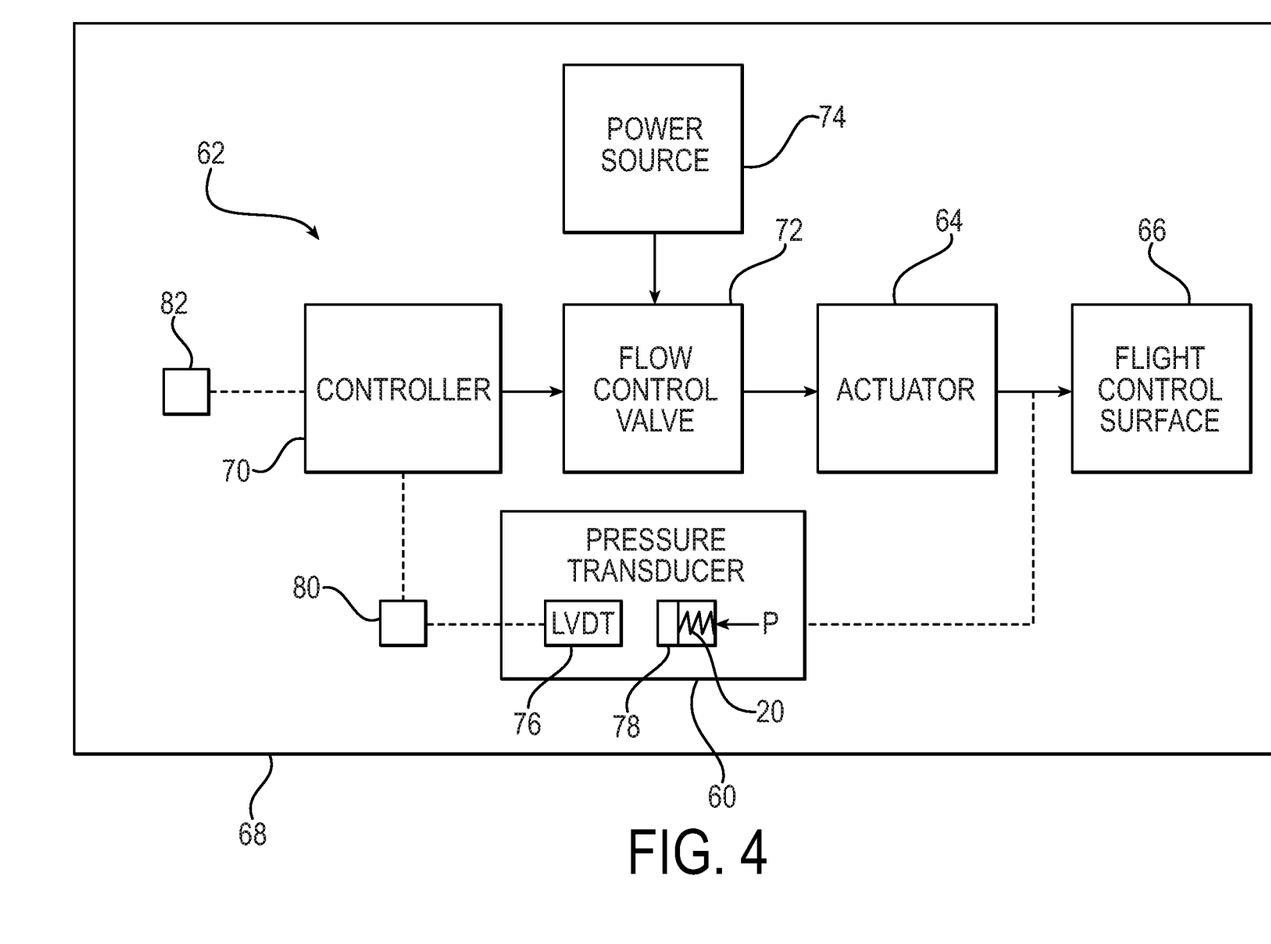
FIG. 4 is a schematic drawing of a servo control system having a pressure transducer with the force sensing spring element of FIG. 2.

With reference to FIG. 4, the spring element 20 may be used as a force sensing element in a differential pressure transducer 60. The differential pressure transducer 60 may be implemented in a servo control system 62, as schematically shown in FIG. 4. A servo control system may be used in any suitable application such as in an aircraft 68. The servo control system 62 may be used to control an actuator 64 for a flight control surface 66 used to stabilize the aircraft 68. The servo control system 62 is operable in accordance with pressure detected by the differential pressure transducer 60. The differential pressure transducer 60 is in communication between the actuator 64 and a servo controller 70.

In an exemplary embodiment, the servo control system 62 may be an electro-hydraulic servo control system and the servo controller 70 is used to operate a flow control valve 72 and control flow being supplied from a hydraulic power source 74 to the actuator 64. The pressure transducer 60 includes the spring element 20 as a sensor and the pressure transducer 60 may be in the form of a linear variable differential transducer (LVDT). The pressure transducer 60 may include at least one LVDT 76 and a hydraulic or pneumatic piston or diaphragm 78 that is moveable by the spring element 20. The piston 78 may be coupled between the LVDT 76 and the spring element 20 such that the LVDT 76 may be positioned in in response to movement of the spring element 20 and the piston 78. The pressure transducer 60 described herein is an example, and the spring element 20 may be suitable for use in other pressure transducers or sensors. For example, the spring element 20 may be used as a unidirectional sensing element for measuring absolute pressure or as a bi-directional sensing element for measuring differential pressure.

When pressure is exerted against the spring element 20, the spring element 20 may move to an extended position, and when pressure is released, the spring element 20 may move to a retracted position. The displacement of the spring 20 results in movement of the LVDT 76 to generate an output signal 80 corresponding to the pressure in the system. The servo controller 70 is configured to receive the output signal 80 from the pressure transducer 60 such that the servo controller 70 may control the flow control valve 72 and the actuator 64 in response to the output signal 70. The servo controller 70 is actuated in response to an input 82, which may be sent to the controller 70 by the pilot of the aircraft 68. The spring element 20 may be suitable for use in other types of control systems and with other types of sensors.

Figure 5:
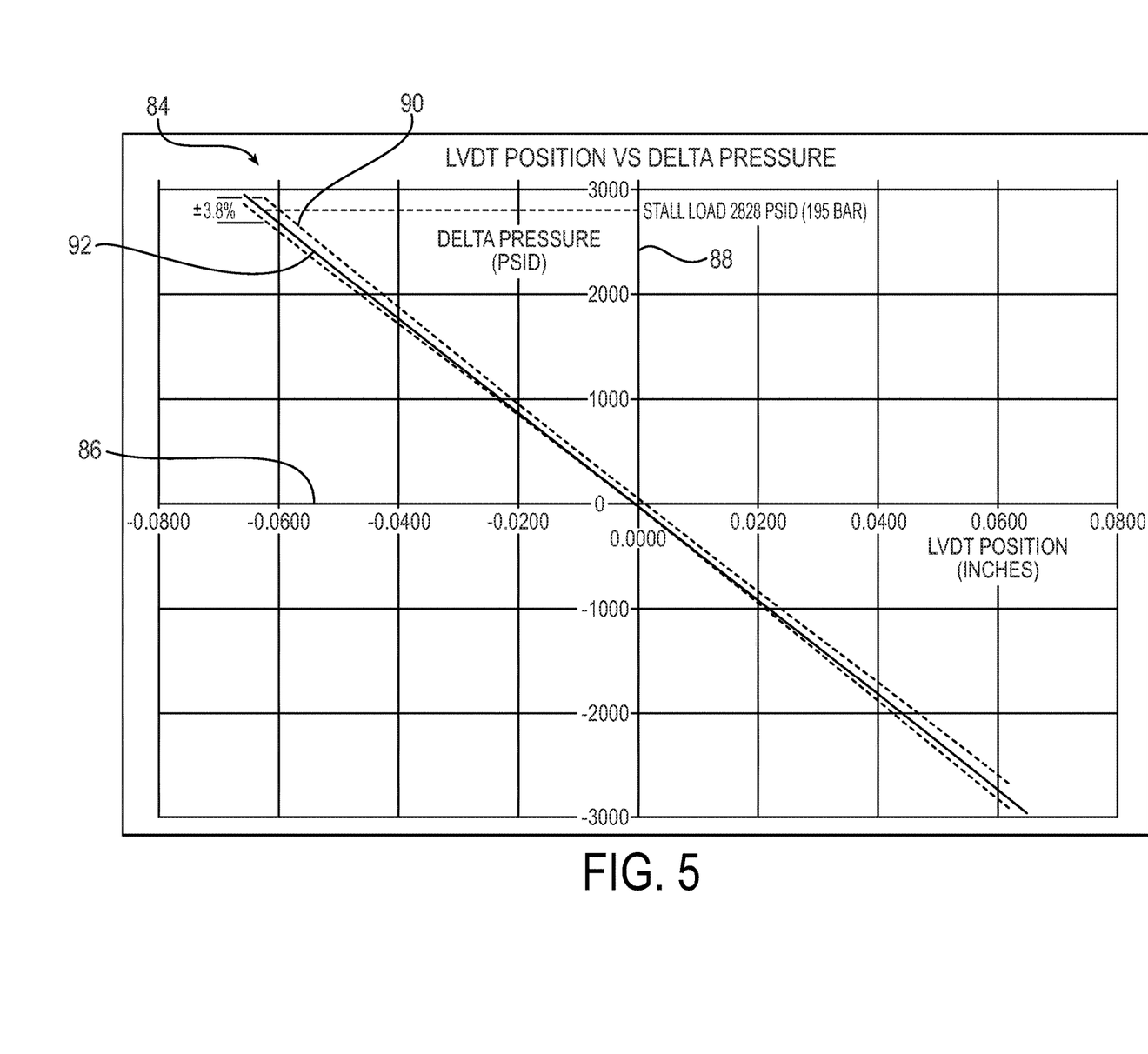
FIG. 5 is a graph showing the position of a linear variable displacement transducer of the pressure transducer in response to varying pressure in the servo control system of FIG. 4.

Referring now to FIG. 5, a hysteresis plot 84 is shown. The plot 84 shows the position of the LVDT 76, in inches, along the x-axis 86 and various delta pressures exerted against the spring element 20 in the pressure transducer 60 along the y-axis 88. The dotted lines 90 correspond to example hysteresis error limits of ±3.8% for the displacement of the LVDT 76 and the spring element 20 as compared with an actual test plot 92. As shown by the actual test plot 92, using the spring element 20 as the sensing element in the pressure transducer 60 provides an accurate linear spring rate and minimal hysteresis when compared to the exemplary hysteresis error limits 90. In contrast, conventional springs have a non-linear load versus deflect due to the steep angles of the spring coils being non-orthogonal with respect to the axis of movement. The spring element 20 provides solely axial movement without lateral movement to minimize friction and hysteresis. As also shown by the actual test plot 92, the axial displacement of the spring element 20 is substantially uniform in both axial directions.

Figure 6:
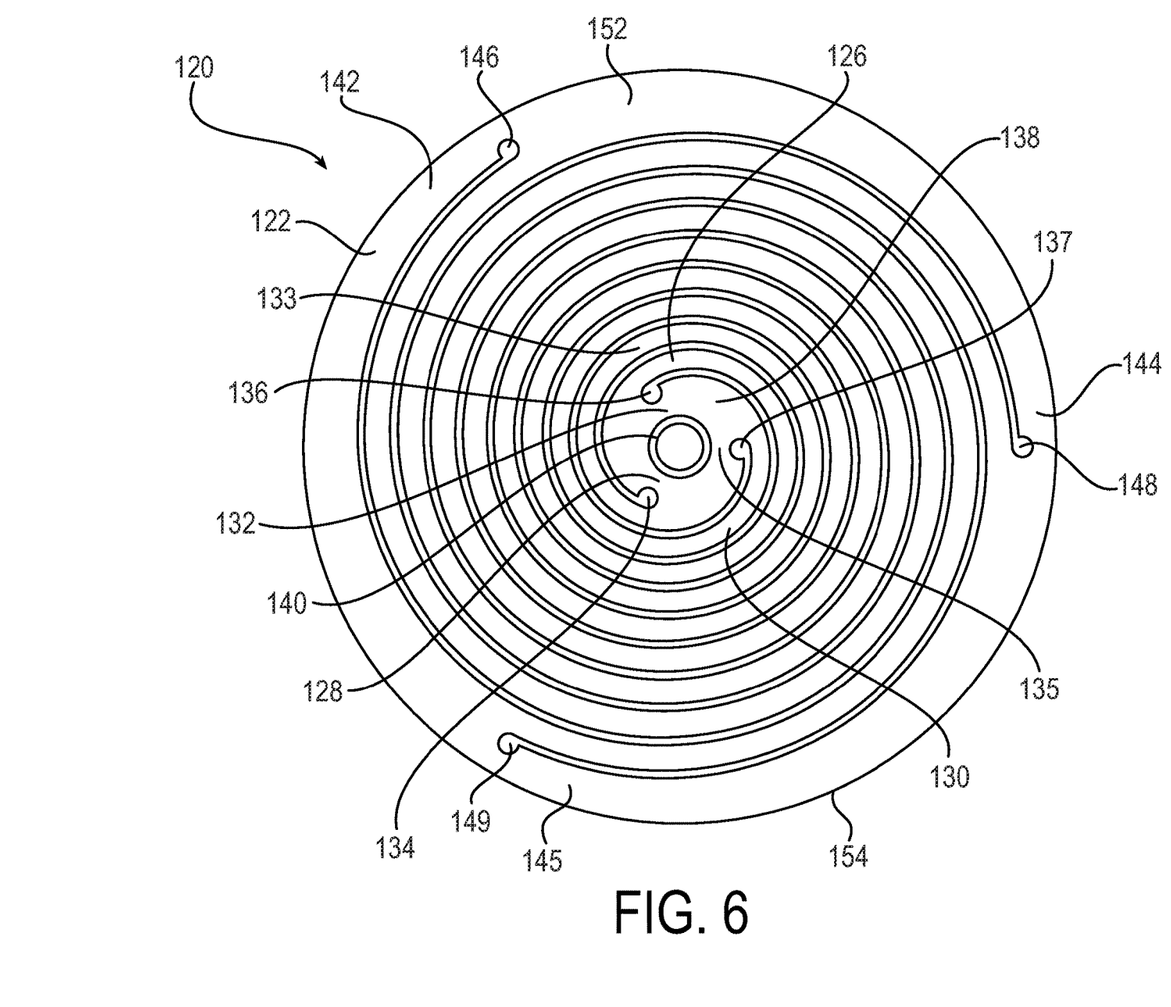
FIG. 6 is a schematic drawing showing a force sensing spring element according to a second embodiment of the present invention.
Figure 7:
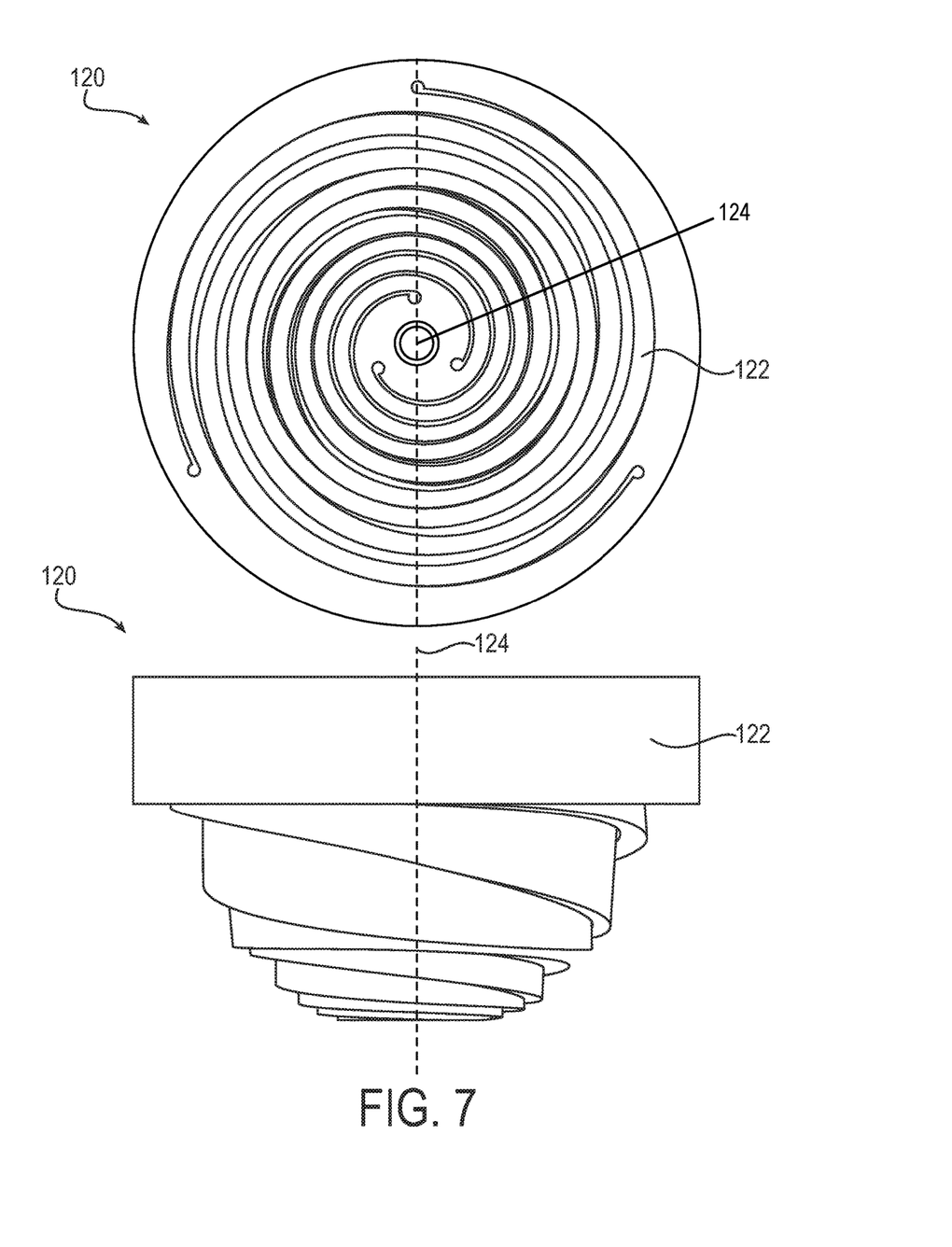
FIG. 7 is a schematic drawing showing the spring element of FIG. 6 in a deflected position.

Referring now to FIGS. 6 and 7, the force sensing spring element 120 according to a second embodiment of the present invention is shown. The force sensing spring element 120 is in the form of a flat disc-type spring having three symmetrical spirals. The spring element 120 has a unitary body 122 that is generally circular and circumscribes a central axis. The unitary body 122 has a first leaf 126 with a first inner end 128, a second leaf 130 with a second inner end 132, and a third leaf 133 with a third inner end 135. Each of the leaves 126, 130, 133 has a plurality of helical flights that are generally defined by one complete circle. Each of the first inner end 128, the second inner end 132, and the third inner end 135 may be defined by a respective groove 134, 136, 137 that extends slightly radially inward from a flight of another leaf 126, 130, 133. For example, the first inner end 128 of the first leaf 126 may be defined by a groove 134 that extends radially inward from a flight of the third leaf 133, the second inner end 132 may be defined by a groove 136 that extends radially inward from a flight of the first leaf 126, and the third inner end 135 may be defined by a groove 137 that extends radially inward from a flight of the second leaf 130.

The unitary body 122 is continuous between each of the first inner end 128 the second inner end 132, and the third inner end 133, such that the inner ends 128, 132, 133 are arranged along a continuous inner circular portion 138 of the spring element 120. The inner ends 128, 132, 135 of the leaves 126, 130, 133 may be arranged 120° relative to each other. The inner circular portion 138 has an inner diameter 140. The leaves 126, 130, 133 are wound in the same plane and in the same direction. Each of the leaves 126, 130, 133 may be identical. As shown in FIG. 6, the leaves 126, 130, 133 are wound in a clockwise direction, but they may alternatively be wound in a counterclockwise direction. The leaves 126, 130, 133 are wound into each other or nested such that the flights of each leaf are inserted between the flights of the other leaf.

The first leaf 126 includes a first outer end 142 at the end of the first spiral, the second leaf 130 includes a second outer end 144 at the end of the second spiral, and the third leaf 133 includes a third outer end 145 at the end of the third spiral. The first outer end 142, the second outer end 144, and the third outer end 145 may be arranged 120° relative to each other. Each of the first outer end 142, the second outer end 144, and the third outer end 145 may be defined by a respective groove 146, 148, 149 that extends slightly radially outwardly from a flight of the opposite leaf. For example, the first outer end 142 of the first leaf 126 may be defined by the groove 146 that extends radially outwardly from a flight of the second leaf 130, the second outer end 144 of the second leaf 130 may be defined by the groove 148 that extends radially outwardly from a flight of the third leaf 133, and the third outer end 145 of the third leaf 133 may be defined by the groove 149 that extends radially outwardly from a flight of the first leaf 126. The unitary body 122 is continuous between the outer ends 142, 144, 145 such that the outer ends 142, 144, 145 may be arranged along an outer circular portion 152 of the spring element 120. The outer circular portion 152 may have an outer diameter 154 that defines the outermost diameter of the spring element 120 when the spring element 120 is flat and not deflected.

As shown in FIG. 7, the spring element 120 may deflect axially along the central axis 124. The spring element 120 may deflect in a first axial direction along the central axis 124 and a second axial direction opposite the first axial direction along the central axis 124. Each of the flights of the unitary body 122 having three spirals have wall thicknesses that are constantly changing from the inner ends 128, 132, 135 towards the outer ends 142, 144, 145. The wall thicknesses may gradually increase from the inner ends 128, 132, 135 towards the outer ends 142, 144, 145. The wall thicknesses may decrease from the outer ends 142, 144, 145 towards the inner ends 128, 132, 135 such that the spring element 120 has a tapered spring flight thickness. The spring element 120 may be used in the servo control system 62 (as shown in FIG. 4).

Using the spring element 20, 120 as a force sensing element in the servo control system 62 for controlling a flight control surface is also advantageous because the spring element 20, 120 may be less bulky and less costly to produce as compared with conventional sensing elements. Additionally, the spring rate is accurate and repeatable over at least 10 million cycles of fully reverse loading. Accordingly, using the spring element 20, 120 is advantageous because the spring element 20, 120 has high repeatability and a long life (or high fatigue life), which is particularly desirable in aircraft applications. In contrast, conventional springs used in other applications have high stress risers at the outer ends of the spirals. Thus, conventional springs do not have a high fatigue life and are not suitable for high-pressure sensing applications.

A force sensing element is used in a pressure transducer, and the force sensing element includes a disc spring having a unitary body that circumscribes a central axis. The disc spring has a plurality of spirals that are continuous with each other and extend radially outwardly from the central axis. The plurality of spirals includes nested symmetrical flights having walls with a non-uniform thickness. The disc spring is uniformly deflectable along the central axis in response to force acting on the disc spring.

The non-uniform thickness of the walls increases radially outwardly from the central axis.

The non-uniform thickness of the walls may increase at a constant rate.

The spring body has a non-linearity of less than one percent.

The nested symmetrical flights may be helical.

The disc spring has an extended position and a retracted position in which the disc spring is flat, the disc spring being axially moveable along the central axis between the extended position and the retracted position.

The disc spring has a first extended position and a second extended position. The disc spring is axially moveable in a first direction from the retracted position towards the first extended position and in a second direction from the retracted position towards the second extended position, and the second direction is directly opposite the first direction.

A distance between the retracted position and the first extended position is equal to a distance between the retracted position and the second extended position.

The disc spring is circular with a thickness and an outer diameter sized to meet the application's requirements.

The disc spring has an inner diameter and an outer diameter, and the symmetrical flights have inner ends proximate the inner diameter and outer ends that are distally opposite the inner ends and proximate the outer diameter.

The inner ends of the symmetrical flights are equidistantly spaced from each other along the inner diameter and the outer ends of the symmetrical flights are equidistantly spaced from each other along the outer diameter.

The unitary body is continuous between each of the inner ends and between each of the outer ends.

The disc spring may have at least two spirals, and the nested symmetrical flights may include a first symmetrical flight having a first inner end and a second symmetrical flight having a second inner end, wherein the first inner end and the second inner end are oriented 180 degrees from each other, and wherein the first symmetrical flight has a first outer end and the second symmetrical flight has a second outer end, and the first outer end and the second outer end are oriented 180 degrees from each other.

The disc spring may have at least three spirals, wherein each of the at least three spirals has a symmetrical flight with an inner end and an outer end, wherein the inner ends are oriented 120 degrees from each other and the outer ends are oriented 120 degrees from each other.

The pressure transducer containing the force sensing element may be used in a servo control system for controlling a flight control surface in an aircraft. The servo control system further includes a servo controller in communication with the pressure transducer, and the servo controller is configured to receive an output signal from the pressure transducer when the disc spring is deflected. The servo control system further includes a flow control valve in communication with the servo controller, and the servo controller is configured to control the flow valve in response to the output signal. The servo control system further includes an actuator in communication with the flow control valve and the flight control surface, and the actuator is configured to control the flight control surface in response to the flow control valve.

The pressure transducer further includes a linear variable differential transducer and a piston that is moveable by the disc spring.

A servo control system for pressure sensing includes a pressure transducer including a disc spring having a unitary body with a plurality of spirals that are continuous with each other and extend radially outwardly from a central axis of the unitary body. The plurality of spirals includes nested symmetrical flights having walls with a non-uniform thickness, and the disc spring is uniformly deflectable along the central axis in response to force acting on the disc spring. The servo control system further includes a servo controller in communication with the pressure transducer, and the servo controller is configured to receive an output signal from the pressure transducer when the disc spring is deflected. The servo control system further includes an actuator in communication with the servo controller, and the actuator is actuated in response to the servo controller.

The non-uniform thickness of the walls increases radially outwardly from the central axis and at a constant rate, and the spring body has a non-linearity of less than one percent.

The disc spring has an inner diameter and an outer diameter, and the symmetrical flights have inner ends proximate the inner diameter and outer ends that are distally opposite the inner ends and proximate the outer diameter. The inner ends of the symmetrical flights are equidistantly spaced from each other along the inner diameter and the outer ends of the symmetrical flights are equidistantly spaced from each other along the outer diameter.

The pressure transducer further includes a linear variable differential transducer and a piston that is moveable by the disc spring.

A force sensing element used in a pressure transducer includes a disc spring having a unitary body that circumscribes a central axis and has a repeating pattern that is symmetrical relative to the central axis, the disc spring being configured to provide linear axial motion while minimizing a radial load, and the disc spring is uniformly deflectable along the central axis in response to force acting on the disc spring.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A servo control system for controlling a flight control surface in an aircraft, the servo control system comprising:
   a pressure transducer containing a force sensing element, the force sensing element comprising a disc spring having a unitary body that circumscribes a central axis and has a repeating pattern that is symmetrical relative to the central axis, the disc spring being configured to provide linear axial motion while minimizing a radial load, wherein the disc spring is uniformly deflectable along the central axis in response to force acting on the disc spring;
   a servo controller in communication with the pressure transducer, wherein the servo controller is configured to receive an output signal from the pressure transducer when the disc spring is deflected;
   a flow control valve in communication with the servo controller, wherein the servo controller is configured to control the flow valve in response to the output signal; and
   an actuator in communication with the flow control valve and the flight control surface, wherein the actuator is configured to control the flight control surface in response to the flow control valve.

2. The servo control system according to claim 1, wherein the disc spring has a plurality of spirals that are continuous with each other and extend radially outwardly from the central axis, the plurality of spirals including nested symmetrical flights having walls with a non-uniform thickness.

3. The servo control system according to claim 2, wherein the disc spring has a non-linearity of less than one percent.

4. The servo control system according to claim 2, wherein the nested symmetrical flights are helical.

5. The servo control system according to claim 2, wherein the disc spring has an inner diameter and an outer diameter, and the symmetrical flights have inner ends proximate the inner diameter and outer ends that are distally opposite the inner ends and proximate the outer diameter.

6. The servo control system according to claim 5, wherein the inner ends of the symmetrical flights are equidistantly spaced from each other along the inner diameter and the outer ends of the symmetrical flights are equidistantly spaced from each other along the outer diameter.

7. The servo control system according to claim 5, wherein the unitary body is continuous between each of the inner ends and between each of the outer ends.

8. The servo control system according to claim 2, wherein the disc spring has at least two spirals, the nested symmetrical flights including a first symmetrical flight having a first inner end and a second symmetrical flight having a second inner end, wherein the first inner end and the second inner end are oriented 180 degrees from each other, and wherein the first symmetrical flight has a first outer end and the second symmetrical flight has a second outer end, and the first outer end and the second outer end are oriented 180 degrees from each other.

9. The servo control system according to claim 2, wherein the disc spring has at least three spirals, wherein each of the at least three spirals has a symmetrical flight with an inner end and an outer end, wherein the inner ends are oriented 120 degrees from each other and the outer ends are oriented 120 degrees from each other.

10. The servo control system according to claim 1, wherein the non-uniform thickness of the walls increases radially outwardly from the central axis.

11. The servo control system according to claim 10, wherein the non-uniform thickness of the walls increases at a constant rate.

12. The servo control system according to claim 1, wherein the disc spring has an extended position and a retracted position in which the disc spring is flat, the disc spring being axially moveable along the central axis between the extended position and the retracted position.

13. The servo control system according to claim 12, wherein the disc spring has a first extended position and a second extended position, the disc spring being axially moveable in a first direction from the retracted position towards the first extended position and in a second direction from the retracted position towards the second extended position, the second direction being directly opposite the first direction.

14. The servo control system according to claim 13, wherein a distance between the retracted position and the first extended position is equal to a distance between the retracted position and the second extended position.

15. The servo control system according to claim 1, wherein the pressure transducer further includes a linear variable differential transducer and a piston that is moveable by the disc spring.

16. A force sensing element comprising:
   a disc spring having a unitary body that circumscribes a central axis and has a repeating pattern that is symmetrical relative to the central axis, the disc spring being configured to provide linear axial motion while minimizing a radial load, wherein the disc spring is uniformly deflectable along the central axis in response to force acting on the disc spring, wherein the disc spring is configured for bidirectional movement along the central axis, wherein the disc spring has a first extended position and a second extended position, the disc spring being axially moveable in a first direction from the retracted position towards the first extended position when loaded and in a second direction from the retracted position towards the second extended position when loaded, the second direction being directly opposite the first direction.

* * * * *